(12) United States Patent
Hansen et al.

(10) Patent No.: US 8,535,484 B2
(45) Date of Patent: Sep. 17, 2013

(54) ULTRA-RESILIENT FABRIC AND METHOD OF MAKING THEREOF

(75) Inventors: Robert Hansen, Muskegon, MI (US); Bjorn Rydin, Ueberöd (SE)

(73) Assignee: Albany International Corp., Albany, NY (US)

( * ) Notice: Subject to any disclaimer, the term of this patent is extended or adjusted under 35 U.S.C. 154(b) by 180 days.

(21) Appl. No.: 13/011,570

(22) Filed: Jan. 21, 2011

(65) Prior Publication Data
US 2012/0189806 A1 Jul. 26, 2012

(51) Int. Cl.
*D21F 7/08* (2006.01)
*B32B 5/12* (2006.01)
*B32B 3/24* (2006.01)

(52) U.S. Cl.
USPC ............ 162/358.2; 162/900; 34/95; 442/366; 428/114; 428/298.1; 428/131

(58) Field of Classification Search
USPC ........ 162/348, 358.1, 358.2, 358.4, 900–904; 139/383 A, 425 A, 383 AA; 442/270, 366; 428/131, 137, 265.4, 298.1, 114; 34/95
See application file for complete search history.

(56) References Cited

U.S. PATENT DOCUMENTS

| | | | |
|---|---|---|---|
| 1,536,533 A * | 5/1925 | Sheehan | 162/358.2 |
| 3,553,857 A | 1/1971 | Isham et al. | |
| 3,733,721 A | 5/1973 | Clemens | |
| 3,815,645 A | 6/1974 | Codorniu | |
| 4,350,731 A | 9/1982 | Siracusano | |
| 4,541,895 A * | 9/1985 | Albert | 162/348 |
| 4,555,440 A | 11/1985 | Crook | |
| 4,608,768 A | 9/1986 | Cavanagh | |
| 4,781,967 A * | 11/1988 | Legge et al. | 428/109 |
| 4,931,358 A | 6/1990 | Wahl et al. | |
| 4,979,543 A | 12/1990 | Moriarty et al. | |
| 5,087,327 A | 2/1992 | Hood | |
| 5,360,656 A * | 11/1994 | Rexfelt et al. | 428/193 |

(Continued)

FOREIGN PATENT DOCUMENTS

DE 42 02 325 A 8/1993
DE 10 2004 038770 2/2006

(Continued)

OTHER PUBLICATIONS

International Search Report and Written Opinion from International Application PCT/US2012/022029.

(Continued)

*Primary Examiner* — Eric Hug
(74) *Attorney, Agent, or Firm* — Frommer Lawrence & Haug LLP; Ronald R. Santucci

(57) ABSTRACT

A structure for use in industrial fabrics such as paper machine clothing and engineered fabrics is disclosed. The structure includes one or more layers of an elastic nonwoven extruded film or sheet, which is elastic, resilient, and compressible in a thickness direction, and extensible, bendable, and resilient in its length and transverse directions, and one or more layers of a plurality of substantially parallel machine direction (MD) yarns in various patterns. The structure can also include one or more layers of a plurality of substantially parallel cross-machine direction (CD) yarns attached on top of or under the MD yarns. The structure has a high degree of both compressibility under an applied normal load and excellent recovery (resiliency or spring back) upon removal of that load.

63 Claims, 8 Drawing Sheets

(56) References Cited

U.S. PATENT DOCUMENTS

| | | | |
|---|---|---|---|
| 5,368,696 A | 11/1994 | Cunnane, III et al. | |
| 5,401,564 A | 3/1995 | Lee et al. | |
| 5,480,646 A | 1/1996 | Vu | |
| 5,597,450 A | 1/1997 | Baker et al. | |
| 6,179,965 B1 | 1/2001 | Cunnane, III et al. | |
| 6,413,889 B1 | 7/2002 | Best et al. | |
| 6,447,648 B1 * | 9/2002 | Slagowski et al. | 162/358.4 |
| 6,723,208 B1 | 4/2004 | Hansen | |
| 2002/0100572 A1 | 8/2002 | Cunnane, III | |
| 2003/0228815 A1 | 12/2003 | Bhatnagar et al. | |
| 2004/0023582 A1 | 2/2004 | Espe | |
| 2004/0219854 A1 * | 11/2004 | Groitzsch et al. | 442/328 |
| 2005/0081570 A1 * | 4/2005 | Karlsson et al. | 66/202 |
| 2006/0278328 A1 * | 12/2006 | Westerkamp et al. | 156/167 |
| 2007/0163741 A1 | 7/2007 | Crook | |
| 2007/0194490 A1 | 8/2007 | Bhatnagar et al. | |
| 2007/0202314 A1 | 8/2007 | Youn et al. | |
| 2007/0243964 A1 * | 10/2007 | Hagfors et al. | 474/260 |
| 2008/0166533 A1 * | 7/2008 | Jones et al. | 428/213 |

FOREIGN PATENT DOCUMENTS

| | | | |
|---|---|---|---|
| EP | 0306313 A | 3/1989 | |
| EP | 0505788 A | 3/1992 | |
| EP | 1302578 A | 4/2003 | |
| EP | 1386723 A | 2/2004 | |
| EP | 1568808 A | 8/2005 | |
| EP | 1 719 834 A | 11/2006 | |
| GB | 1118784 | 7/1968 | |
| GB | 2197886 A | 6/1988 | |
| JP | 2003-193326 A | 7/2003 | |
| WO | WO 93/17180 A | 9/1993 | |
| WO | WO 2004/005018 A | 1/2004 | |
| WO | WO 2004/072368 A | 8/2004 | |
| WO | WO 2007/067949 A | 6/2007 | |
| WO | WO 2009/086533 A | 7/2009 | |
| WO | WO 2010/030298 A | 3/2010 | |

OTHER PUBLICATIONS

International Search Report and Written Opinion from International Application PCT/US2012/022035.

International Search Report and Written Opinion from EPO for PCT/US2008/088478 mailed Jul. 2, 2009.

International Search Report and Written Opinion from EPO for PCT/US2008/088450 mailed Apr. 15, 2009.

International Search Report and Written Opinion from EPO for PCT/US2010/036398 mailed Sep. 15, 2010.

International Search Report and Written Opinion from EPO for PCT/US2010/036385 mailed Oct. 7, 2010.

* cited by examiner

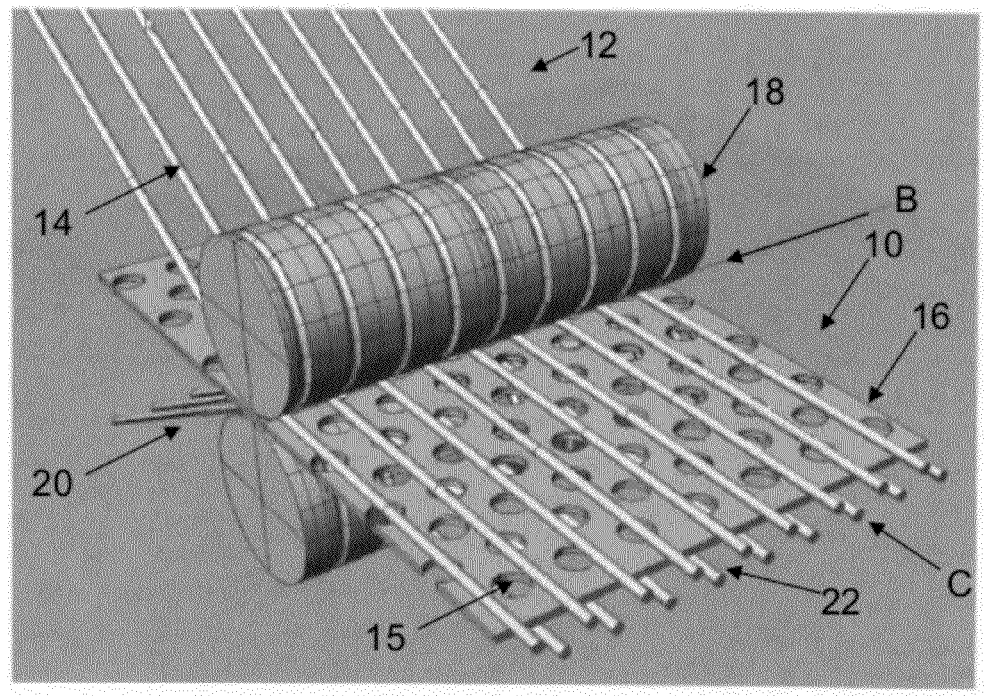
FIG. 1(a)
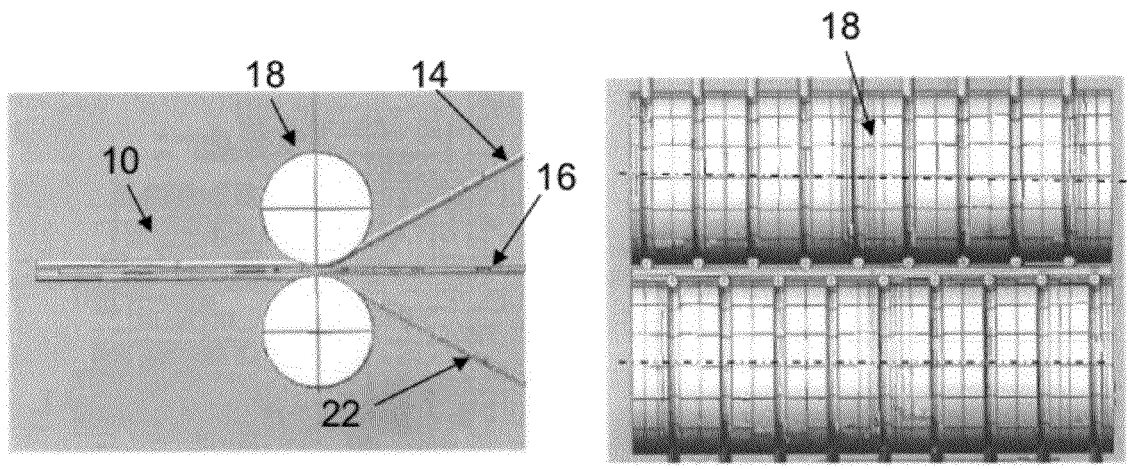
FIG. 1(b)  FIG. 1(c)

ULTRA-RESILIENT FABRIC AND METHOD OF MAKING THEREOF

FIELD OF THE INVENTION

The present invention relates to structures for use in industrial fabrics such as paper machine clothing and engineered fabrics. More specifically, the structures include one or more elastic members, which may be compressible and resilient in a thickness direction and resilient in a length direction, and relatively inelastic functional yarns in various patterns. Such structures have a high degree of both compressibility under an applied normal load and excellent recovery (resiliency or spring back) upon removal of that load.

BACKGROUND OF THE INVENTION

Industrial fabrics means an endless structure in the form of a continuous loop such as one used as a forming, press or dryer fabric (paper machine clothing or PMC) as well as a process belt such as a shoe press, calendar, or transfer belt used on a paper machine. Industrial fabrics also means a fabric used in textile finishing processes. Industrial fabrics also include other endless belts where a high degree of compressibility and resiliency is required.

While the discussion herein concerns for the most part the papermaking process in general, the application of the invention is not considered limited thereto.

In this regard, during the papermaking process, for example, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Base fabrics, which form an important portion of the above discussed fabrics, take many different forms. For example, they may be woven either endless or flat, and subsequently rendered into endless form with a woven seam using one or more layers of machine direction (MD) and cross machine direction (CD) yarns. Also such fabrics may employ what is referred to as a pin seam also formed from MD yarns to allow installation on the paper machine. Further, the base fabrics may be laminated by placing one base fabric within the endless loop formed by another base fabric, and joining or laminating them together by various means known to those skilled in the art such as by needling staple fiber batt through both base fabrics to join them to one another.

In paper machine clothing (PMC) especially press fabrics used in the press section of a paper machine, the fabric has one or more "base structures" formed from yarns and staple fiber batt needled into usually at least the sheet contact surface. The press fabric has an initial thickness, mass, and consequent void volume (the calculated volume based upon this mass and thickness) which equates to water handling capacity. They also have a measurable contact area.

Since press fabrics are subjected to normal loads (normal to the fabric plane in use) as it passes through one or more press nips, the fabric has a compressed void volume and surface contact area as well. While there have been various attempts to change the degree of compressibility, press fabrics become progressively thinner over time and millions of nip cycles. Eventually they must be removed due to various reasons such as lack of water handling capability, marking, or press vibration. When they have reached the end of their useful lifetime they must be removed and replaced with a new fabric.

New fabrics also go through a break in period wherein the density is not ideal and water handling is less than optimum. Accordingly, an ideal press fabric is one that has near constant or steady state performance (for example water handling capability) from day one until it is removed from the paper machine.

Various attempts have been made to affect press fabric properties, especially compressibility and resiliency. One attempt has been to introduce "elastic" yarns into structures. One example of this is seen in PCT application WO 2004/072368 A1. There are shortcomings to this approach, however. The compressibility is only due to the elastic portion (in the through thickness direction) of the yarn, and is therefore limited to such. While larger yarns can be used, there is eventually a diminishing return on performance. Also large yarns are heavy, and can cause objectionable sheet marking. If the yarn is a sheath/core type, there is always the danger of delamination of the sheath from the core. Finally, the degree of compressibility is limited to a maximum of some fraction of the yarn diameter.

Another example is U.S. Patent application 2007/0163741 A1, which incorporates an array of compressible sheath/core yarns attached to the backside of a seamed press fabric. It is taught that the sheath is elastomeric, and can provide vibration dampening effects. It further teaches that the yarn core alone can be 200 to 2000 denier, and a total size of 0.30 to 1.2 mm in diameter. Such yarn sizes can be limited in use due to weight and potential marking considerations.

A further example is taught in U.S. Pat. No. 4,350,731 which teaches the use of wrapped yarns to make a compressible press fabric structure. Again the degree of compressibility and recovery is due to only the elastomeric wrapping sheath layers.

Another example of this type of structure is taught in GB 2 197 886. This patent discloses compressible yarns, which are alternated in some manner with functional (tensile) load bearing yarns to provide, under an applied normal load, a dense, quasi-single layer base structure without "knuckles" and with long weave floats to provide a quasi-crossless base construction.

Yet another example is disclosed in U.S. Pat. No. 5,087,327 to Hood, which relates to a composite yarn for use in a papermaker's fabric. The composite yarn includes a soluble core surrounded by a layer of non-soluble monofilament.

Yet another example is disclosed in U.S. Pat. No. 5,597,450, which relates to a paper machine dryer fabric including hollow thermoplastic monofilaments in the cross-machine direction.

A further example is disclosed in U.S. Publication No. 2002/0100572, which relates to a papermaking fabric having beam construction yarns that resist lateral, vertical and torsional deflection as well as compression when interwoven. The yarns are non-circular in cross-section, such as I-beam, H-beam, and box-beam.

A further example is a structure taught in U.S. Pat. No. 4,781,967. Such a structure is defined to be relatively incompressible as the stacked yarn arrays do not compress nor move relative to any other layer. In other words, when there is an applied load normal to the plane of the structure, there is little thickness change, except for any yarn deformation which is permanent. If an elastomeric (in the yarn thickness direction) is employed as the yarns in an entire layer, the compressibility of the structure is limited to some portion of that yarn diameter.

Yet another example is taught in U.S. Pat. No. 4,555,440. Again this structure is considered incompressible as there is little through thickness change when a normal load is applied or removed.

Incorporating "elastic" (in the thickness or radial direction) yarns into fabrics has affected to some degree the resiliency or spring back of these fabric structures once the normal load is removed. But again, using these yarns, the degree of compressibility and spring back is limited to some portion of the yarn diameter at most.

As stated above, because of this limited resiliency, press fabrics have a relatively high void volume to handle water when new, more than is ideally required. They will compact and reach an optimum performance level for a period of time. However as they have limited resiliency, they will continue to compact, eventually requiring removal and replacement due to lack of water removal, sheet marking, press vibration, or some other undesired performance characteristic.

SUMMARY OF THE INVENTION

Accordingly, it is a principal object of the present invention to provide a base structure that is substantially more compressible and resilient than those of the prior art, and that maintains its compressibility and resiliency through its entire lifetime.

In this regard, the instant invention provides for a base support structure that combines one or more elastic members with excellent compressibility and resiliency with one or more layers of relatively inelastic functional yarns in several types of patterns, for use as the structure itself; or at least as a layer of a base support structure in PMC, industrial process belts, textile finishing belts, and other belts that require a high degree of compressibility and resiliency.

An elastic nonwoven extruded film or sheet that is defined as elastic, resilient, and compressible in its thickness direction, and extensible, bendable, and resilient in its length and transverse directions is required for all the embodiments discussed herein. The elastic nonwoven extruded film or sheet can be perforated so as to have a plurality of through holes distributed in a predetermined symmetric pattern or in a random asymmetric pattern. The elastic nonwoven extruded film or sheet can be composed of any elastic material, such as thermoplastic polyurethane (TPU) or any other elastic material. Examples of good elastic materials include, but are not limited to, polymers such as polyurethane, rubber, silicone or that sold under trademarks Lycra® by Invista or Estane® by Lubrizol. The through holes formed in the elastic nonwoven film or sheet may have a suitably sized circular or non-circular shape. The non-circular shapes may include, but are not limited to, square, rectangular, triangular, elliptical, trapezoidal, hexagonal and other polygonal shapes.

A first embodiment employs a structure in its simplest form described as follows. Layer (1), which is the uppermost layer, is an array of parallel functional yarns. Functional yarns can include any type of yarn as known by ordinarily skilled artisans. For example, if they are oriented in the machine or running direction, they can be tensile load bearing yarns. For a press fabric structure, polyamide would be a desired polymer choice. The functional yarns can be of any size, shape, material or form as required for the particular application known to those skilled in the art, for example, the functional yarns can have a circular or non-circular cross-sectional shape including, but not limited to, square, rectangular, triangular, elliptical, trapezoidal, hexagonal and other polygonal shape. The next layer (2) is the required elastic nonwoven extruded film or sheet. A third layer (3) is also a parallel array of functional yarns that are located on the opposite side of layer (2); however, the yarns in layer (3) are arranged such that each layer (3) yarn lines up with the space between two adjacent layer (1) yarns causing what is called "nesting." The layers of the structure can be held together in any manner known to one of ordinary skill in the art. For instance, they can be attached using a fibrous layer as taught in the aforementioned U.S Pat. No. 4,781,967, the entire content of which is incorporated herein by reference, or the yarns in one layer can be attached to the elastic nonwoven extruded film or sheet in an adjacent layer at the point where they touch the extruded film or sheet via use of glues, adhesives, or a thermal fusion/welding method as known to those skilled in the art.

Note yarn systems (1) and (3) can be the same as each other or they can be different in terms of material, form, shape, etc. It is only required that the yarns in layer (3) are spaced to fit between adjacent yarns of layer (1) or vice versa.

Also note there does not have to be a one to one relationship between the number of yarns of layers (1) and (3), and the number of yarns in layer (3) can be only a fraction of the number of yarns in layer (1) or vice versa. For example, layer (3) may contain only half the yarns of layer (1) so that there are spaces between the yarns of layer (3) in use, creating additional void volume/water handling/water removal capability.

Other functional layers can also be attached, for example by lamination, for either functionality or property enhancement of the final structure. For example, one or more CD yarn arrays may be attached on top of layer (1) or under layer (3) to provide CD stability. The CD yarns in one layer can be attached to the surface in an adjacent layer at points where they touch each other via use of glues, adhesives, or thermal fusion/welding methods known to those skilled in the art. One or more layers of fibrous batt may be applied to this structure on the sheet contact side and/or machine side by methods known to those skilled in the art to enhance bonding between the layers. As a further example, a functional coating may be applied on one or both sides of the structure to improve resistance to contamination and/or abrasion, for example.

Accordingly, one exemplary embodiment of the present invention is a compressible resilient industrial fabric comprising one or more layers of an elastic nonwoven extruded film or sheet, wherein the nonwoven extruded film or sheet is elastic, resilient, and compressible in a thickness direction and extensible, bendable, and resilient in the length and transverse directions, and two or more layers of a plurality of substantially parallel machine direction (MD) yarns attached on either side of the nonwoven extruded film or sheet so as to allow "nesting" of the parallel MD yarns from one layer between the parallel MD yarns of the other layer. The fabric can also include one or more layers of a plurality of substantially parallel cross-machine direction (CD) yarns attached on the outside of the two or more layers of parallel machine direction (MD) yarns.

Another exemplary embodiment of the present invention is a compressible resilient industrial fabric comprising (a) a first layer of a plurality of substantially parallel machine direction (MD) yarns, (b) a second layer of an elastic nonwoven extruded film or sheet, wherein the nonwoven extruded film or sheet is elastic, resilient, and compressible in a thickness direction and extensible, bendable, and resilient in the length and tranverse directions, (c) a third layer of a plurality of substantially parallel machine direction (MD) yarns, (d) a fourth layer of a plurality of substantially parallel cross-machine direction (CD) yarns, (e) a fifth layer of the nonwoven extruded film or sheet, (f) a sixth layer of a plurality of substantially parallel cross-machine direction (CD) yarns, and (g) a seventh layer of the nonwoven extruded film or sheet.

Yet another embodiment of the present invention is a method of forming a compressible resilient industrial fabric. The method includes providing one or more layers of an elastic nonwoven extruded film or sheet, wherein the nonwoven extruded film or sheet is elastic, resilient, and compressible in a thickness direction and resilient, extensible and bendable in the length and transverse directions, and attaching one or more layers of a plurality of substantially parallel functional machine direction (MD) yarns on top of and under the nonwoven extruded film or sheet. The method can also include the step of attaching by methods known in the art, one or more layers of a plurality of substantially parallel cross-machine direction (CD) yarns on top of or under the one or more layers of parallel machine direction (MD) yarns.

Yet another embodiment of the present invention is a method of forming a compressible resilient industrial fabric. The method includes (a) providing a first layer of a plurality of substantially parallel machine direction (MD) yarns, (b) attaching a second layer of an elastic nonwoven extruded film or sheet on top of the first layer, wherein the nonwoven extruded film or sheet is elastic, resilient, and compressible in a thickness direction and extensible, bendable, and resilient in the length and transverse directions, (c) attaching a third layer of a plurality of substantially parallel machine direction (MD) yarns on top of the second layer, (d) applying a fourth layer of a plurality of substantially parallel cross-machine direction (CD) yarns on top of the third layer, (e) applying a fifth layer of the nonwoven extruded film or sheet on top of the fourth layer, (f) applying a sixth layer of a plurality of substantially parallel cross-machine direction (CD) yarns on top of the fifth, and (g) applying a seventh layer of the nonwoven extruded film or sheet on top of the sixth layer.

The resilient compressible structure can be included in any number of final fabrics including: paper machine clothing, such as a forming fabric, a press fabric, a dryer fabric, a through air dryer fabric, a shoe press belt base, a calendar belt base, or a transfer belt base; an engineered fabric; or a fabric used in the production of nonwovens by processes such as airlaid, melt blowing, spunbonding, and hydroentangling; or an industrial process belt such as a textile finishing belt, or other belts that require a high degree of compressibility and resiliency. In any or all of these fabrics, the inventive structure can be a part of the final fabric or it can be the fabric itself. Where the fabric is a base for a dryer fabric, the dryer fabric can include a backside or a non-sheet contact side of the fabric, the backside including angled components. Such angled components can be yarns, extruded elements, or a component of a laminated layer such as shown in FIG. 9.

For a better understanding of the invention, its operating advantages and specific objects attained by its uses, reference is made to the accompanying descriptive matter in which preferred, but non-limiting, embodiments of the invention are illustrated.

Terms "comprising" and "comprises" in this disclosure can mean "including" and "includes" or can have the meaning commonly given to the term "comprising" or "comprises" in U.S. Patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

BRIEF DESCRIPTION OF THE DRAWINGS

Thus by the present invention its objects and advantages will be realized, the description of which should be taken in conjunction with the drawings wherein:

FIGS. 1(a)-1(c) illustrate a method of making a compressible resilient industrial fabric, according to one embodiment of the present invention;

DETAILED DESCRIPTION OF THE INVENTION

Figure 2:
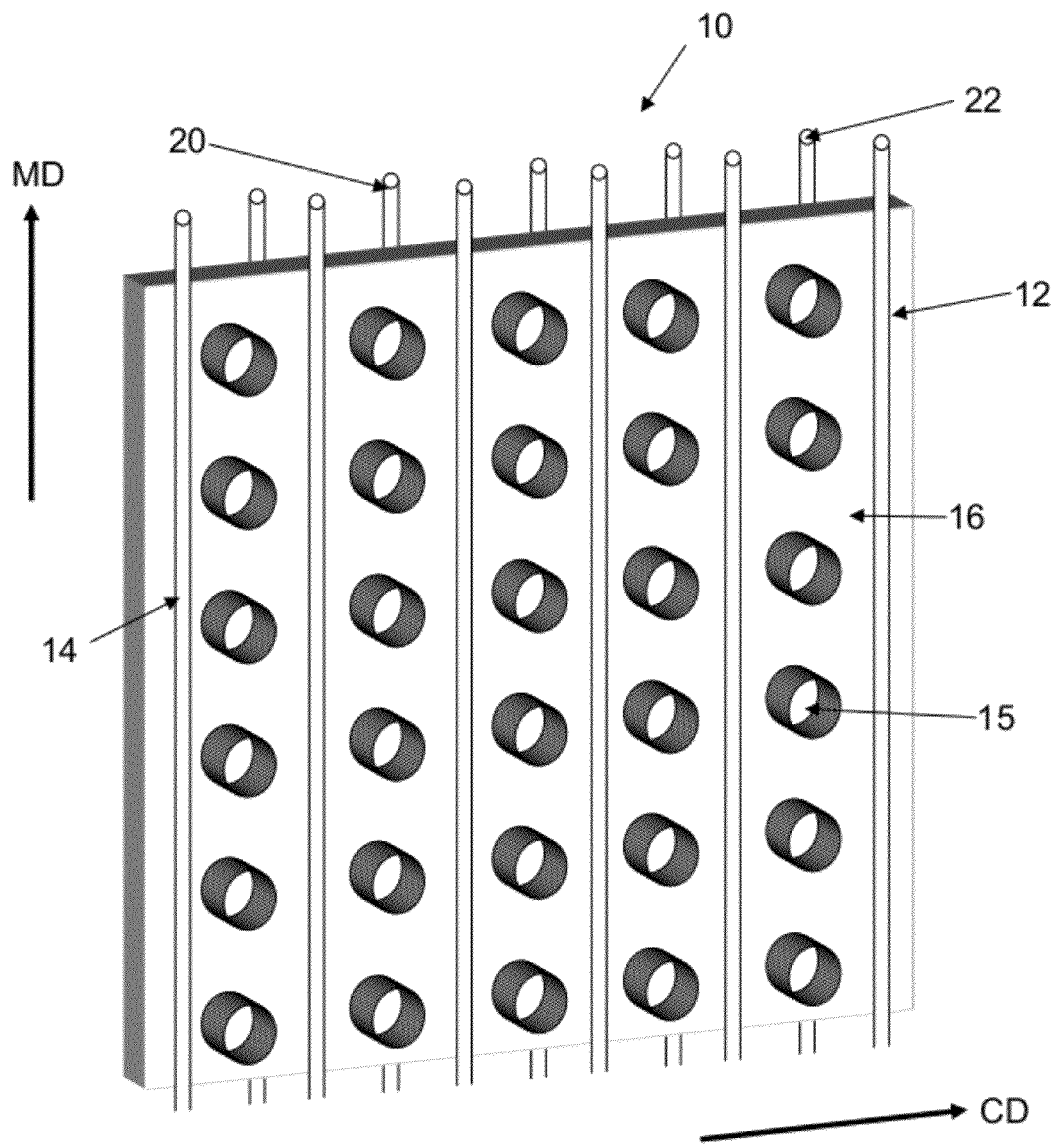
FIG. 2 is a profile view of an industrial fabric, according to one embodiment of the present invention.

Initially although a press fabric will be discussed, as aforesaid the present invention has application to other type fabrics or belts including forming fabrics, dryer fabrics, through air dryer (TAD) fabrics, shoe press belts, calendar belts, or transfer belts; engineered fabrics; or fabrics used in the production of nonwovens by processes such as airlaid, melt blowing, spunbonding, and hydroentangling; or industrial process belts such as textile finishing belts, or other belts that require a high degree of compressibility and resiliency.

An elastic nonwoven extruded film or sheet that is defined as elastic, resilient, and compressible in its thickness direction and extensible, bendable, and resilient in its length and transverse directions is required for all the embodiments discussed herein. The elastic nonwoven extruded film or sheet can optionally be perforated so as to have a plurality of through holes or voids distributed in a predetermined symmetric pattern or in a random asymmetric pattern. The elastic nonwoven extruded film or sheet can be composed of any elastic material, such as thermoplastic polyurethane (TPU) or any other elastic material. Examples of good elastic materials include, but are not limited to, polymers such as polyurethane, rubber, silicone or that sold under trademarks Lycra® by Invista or Estane® by Lubrizol. The through holes formed in the nonwoven film or sheet may have a suitably sized circular or non-circular shape. The non-circular shapes may include, but are not limited to, square, rectangular, triangular, elliptical, trapezoidal, hexagonal and other polygonal shapes. Holes can be formed in the film or sheet when it is extruded, or they can be mechanically punched or thermally formed after the film or sheet is extruded; or at other points during fabric formation.

One exemplary embodiment of the present invention is a compressible resilient industrial fabric including one or more layers of an elastic nonwoven extruded film or sheet, wherein the nonwoven extruded film or sheet is elastic, resilient, and compressible in a thickness direction and extensible, bendable, and resilient in the length and tranverse directions, and one or more layers of a plurality of substantially parallel functional machine direction (MD) yarns attached on top of and under the nonwoven extruded film or sheet. The fabric can also include one or more layers of a plurality of substantially parallel cross-machine direction (CD) yarns attached on the outside of the one or more layers of parallel machine direction (MD) yarns.

Turning now more particularly to the drawings, a method of making an industrial fabric base structure 10 is shown, for example, in FIGS. 1(a)-1(c), wherein a first or top (1) layer 12 comprised of functional yarns 14 in a parallel array is oriented in the machine direction (MD) or running direction. They can be of any size, shape, material or form suitable for the purpose. This applies to all the yarns referred to herein. For example, the functional yarns can have a circular or non-circular cross-sectional shape including, but not limited to, square, rectangular, triangular, elliptical, trapezoidal, hexagonal and other polygonal shape.

A second or middle (2) layer 16 of an elastic nonwoven extruded film or sheet 16 having the elastic features as aforesaid is provided. As aforementioned, the elastic nonwoven extruded film or sheet 16 can optionally be perforated so as to have a plurality of through holes 15 distributed in a predetermined symmetric pattern or in a random asymmetric pattern. The elastic nonwoven extruded film or sheet 16 can be composed of any elastic material, such as thermoplastic polyurethane (TPU) or any other elastic material. Examples of good elastic materials include, but are not limited to, polymers such as polyurethane, rubber, silicone or that sold under trademarks Lycra® by Invista or Estane® by Lubrizol. The through holes 15 formed in the nonwoven film or sheet 16 may have a suitably sized circular or non-circular shape. The non-circular shapes may include, but are not limited to, square, rectangular, triangular, elliptical, trapezoidal, hexagonal and other polygonal shapes. Holes 15 can be formed in the film or sheet when it is extruded, or they can be mechanically punched or thermally formed after the film or sheet is extruded; or at other points during fabric formation.

A third or bottom (3) layer 20 comprised of functional yarns 22 is provided in the form of a parallel array on the other side of layer 16. As it can be seen, yarns 22 in layer 20 are positioned or aligned within the spaces between adjacent yarns 14 in top (1) layer 12. This is more apparently seen in FIG. 1(c), which is a front view of the process set up shown in FIG. 1(a) along arrow C. FIG. 1(b) is a side view of the process set up shown in FIG. 1(a) along arrow B. As seen in FIGS. 1(a) and 1(c), yarn guiding cylinders or rolls 18 have a grooved outer surface, and the grooves may be spaced apart so as to accommodate and guide the yarns 14, 22 onto the nonwoven sheet 16, such that each layer 12 yarn lines up within the space between two adjacent layer 20 yarns.

Figure 3:
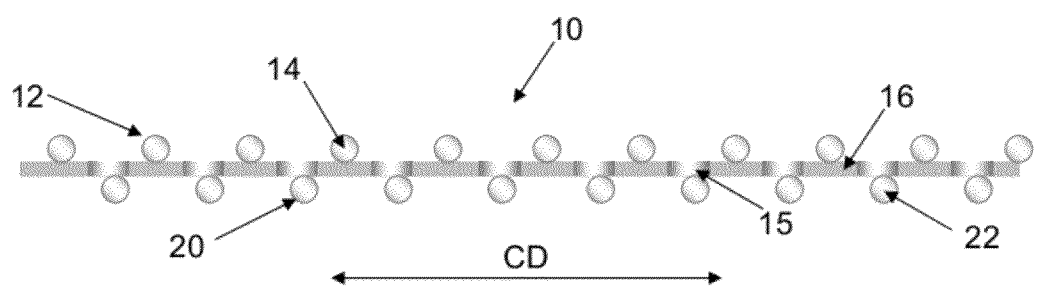
FIG. 3 is a cross-sectional view of the industrial fabric shown in FIG. 2 along its CD.

A schematic of a compressible resilient industrial fabric formed according to this exemplary embodiment is shown in FIG. 2. As shown, base structure 10 has a first or top (1) layer 12 comprised of functional yarns 14 in a parallel array oriented in the machine direction (MD) or running direction, a second or middle (2) layer 16 of a nonwoven extruded film or sheet 16 having the elastic features as aforesaid, and a third or bottom (3) layer 20 comprised of functional yarns 22 is provided in the form of a parallel array on the other side of layer 16. Yarns 22 in layer 20 are positioned or aligned within the spaces between adjacent yarns 14 in top (1) layer 12 as described above. A cross-sectional view of the base structure 10 along the cross-machine direction (CD) is shown in FIG. 3, for example.

The layers of the structure can be held together in any manner known to one of ordinary skill in the art. For instance, they can be attached using a fibrous batt layer as taught in the aforementioned U.S. Pat. No. 4,781,967, the entire content of which is incorporated herein by reference, or the yarns in one layer can be attached to the nonwoven extruded film or sheet in an adjacent layer at the point where they touch the extruded film or sheet via use of glues, adhesives, or a thermal fusion/welding method as known to those skilled in the art.

Note yarn systems (1) and (3) can be the same as each other or they can be different in terms of material, form, shape, etc. It is only required that the yarns in layer (3) are spaced to fit between adjacent yarns of layer (1) or vice versa.

Also note there does not have to be a one to one relationship between the number of yarns of layers (1) and (3), and the number of yarns in layer (3) can be only a fraction of the number of yarns in layer (1) or vice versa. For example, layer (3) may contain only half the yarns of layer (1) so that there are spaces between the yarns of layer (3) in use, creating additional void volume/water handling/water removal capability.

Figure 4:
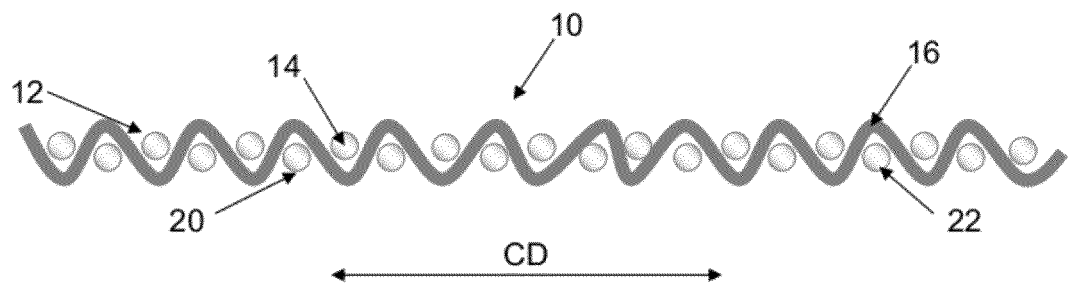
FIG. 4 is an exaggerated view of the industrial fabric shown in FIG. 3 under normal load.

When used as a press fabric and upon application of a compressive load as the press fabric enters a press nip on a paper machine, the nonwoven extruded layer 16 compresses and stretches around functional yarns 14, 22, allowing the yarns 14 and 22 to move towards each other and to "nest" between each other, virtually almost in the same plane. At this point, nonwoven extruded layer 16 conforms to this nesting, and bends and flattens around yarns 14, 22 in the top layer 12 and bottom layer 20. For ease of comprehension, an exaggerated view of base structure 10 in such a state is shown in FIG. 4, for example. Upon release of the load as the fabric exits the nip, due to the elastic and resilient behavior of the extruded layer 16, it will cause the yarn layers 12 and 20 to move apart from each other or "spring back", returning the fabric to its desired thickness and openness. Therefore, a fabric having a total thickness of the thickness of yarns 14 plus the thickness of yarns 22 plus the thickness of nonwoven extruded layer 16 under a normal uncompressed state is compressible and resilient to almost an entire yarn thickness, i.e. the thickness lost due to compression is some portion of the nonwoven extruded layer 16, and the fabric in compression can be almost as thin as the thicker (larger) diameter of yarn 14 or 22.

It has been observed in the present case, that the instant fabric increases a press nip width by up to 5 mm when compared to a press nip width created by a conventional press fabric of the same initial thickness under the same normal load. These properties are important as they affect: uniformity of pressure distribution under load as well as the total contact area; fast startup as the fabric compresses easily to the desired in nip void volume; vibration dampening as the structure acts as a dampening "spring"; and the quick recovery of thickness may help to minimize rewet during the expansion phase of press nip dewatering.

It is important to note that the yarn arrays of layers 12 and 20 can also be oriented in the CD in the fabric in use so long as the elastic nonwoven film or sheet 16 separates and is in between these layers, and at least one functional layer on the outer side of the fabric is oriented in the MD to bear the tensile load and provide adequate strength and stretch resistance to the structure in use. It is also important to note that although functional yarns 14, 22 are illustrated as having a round cross-section in some figures, they can be of any size, shape, material or form suitable for the purpose.

Another embodiment employs a similar principle as that shown in FIG. 3, but the structure includes a fourth layer (4) of the nonwoven extruded film or sheet on the opposite side of the third layer (3) as the second layer, and a fifth layer (5) of parallel yarns in the same direction as the first layer (1). In this embodiment, the yarns of the fifth layer (5) are aligned in the same vertical plane in a through thickness direction as that of the first layer (1).

Figure 5:
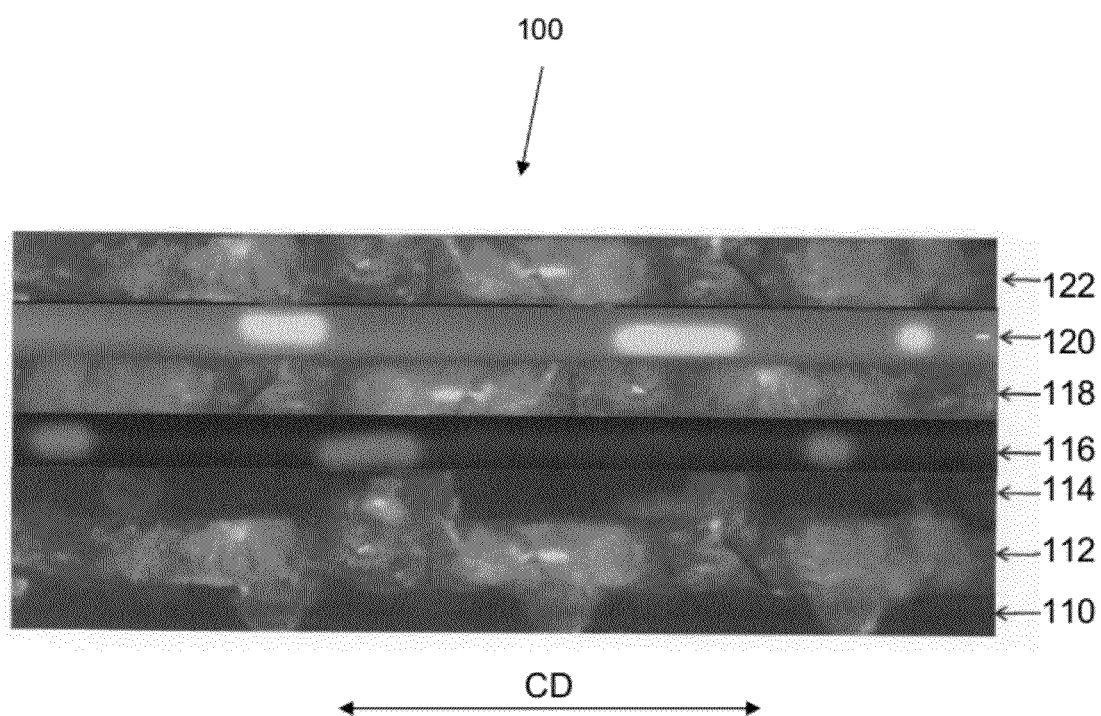
FIG. 5 is a cross-sectional view of an industrial fabric along its CD, according to one embodiment of the present invention.

Another variant of the instant "crossless" structure is shown in FIG. 5, in which the base substrate 100 is shown comprising seven layers in generally parallel planes with each layer comprising a plurality of parallel yarns/members and the necessary elastic nonwoven extruded films or sheets. The compressible resilient fabric, according to this exemplary embodiment, includes (a) a first layer 110 of parallel machine direction (MD) yarns, (b) a second layer 112 of the nonwoven extruded film or sheet, which is elastic, resilient, and compressible in a thickness direction and extensible, bendable, and resilient in its length and transverse directions, (c) a third layer 114 of parallel machine direction (MD) yarns offset in the spaces between yarns of the first layer 110, (d) a fourth layer 116 of parallel cross-machine direction (CD) yarns, (e) a fifth layer 118 of the nonwoven extruded film or sheet, (f) a sixth layer 120 of parallel cross-machine direction (CD) yarns offset in the spaces between yarns of the fourth layer 116, and (g) a seventh layer 122 of the nonwoven extruded film or sheet. In other words, the yarns of the first and third layer 110, 114 are oriented in the machine direction, for example, while the yarns of the fourth and sixth layers 116, 120 are oriented in the cross-machine direction, for example. The first layer can be on a machine side of the fabric, and the seventh layer is on a sheet side of the fabric, for example. The CD layers can be a functional yarn layer to aid in CD stability or to provide a greater degree of void volume under load. It should be noted, however, that seventh layer 122 is purely optional, and may not be necessary for proper functioning of this embodiment. Layer 122 may have through holes or voids as a press fabric, for example. For other uses, layer 122 may also have some additional texture provided by laser graving or etching, for example. For other industrial uses, layer 122 may not be perforated with holes or voids (e.g. a tanning belt).

As shown in FIG. 5, MD functional yarns 114 in the third layer are spaced apart in the manner described above such they fall between the yarns 110 of the first layer, thereby causing the "nesting" described above. Similarly, CD functional yarns 116 in the fourth layer are spaced apart such they fall between the yarns 120 of the sixth layer, thereby causing the "nesting" described above. Though the embodiment described herein has the first and third layer oriented in the machine direction, the fourth and sixth layer oriented in the cross-machine direction, and the nonwoven extruded film or sheet placed in the second, fifth and seventh layers, the layers can be interchangeably used, so long as there is at least one layer of the elastic nonwoven extruded film or sheet between like yarn layers (layers oriented in the same direction) to provide the compressible and resilient property, and at least one MD layer of tensile load bearing yarns to provide adequate strength and stretch resistance to the fabric in use. Again yarns in all these layers can be the same or different from each other in form, material, shape, etc.

Figure 6A:
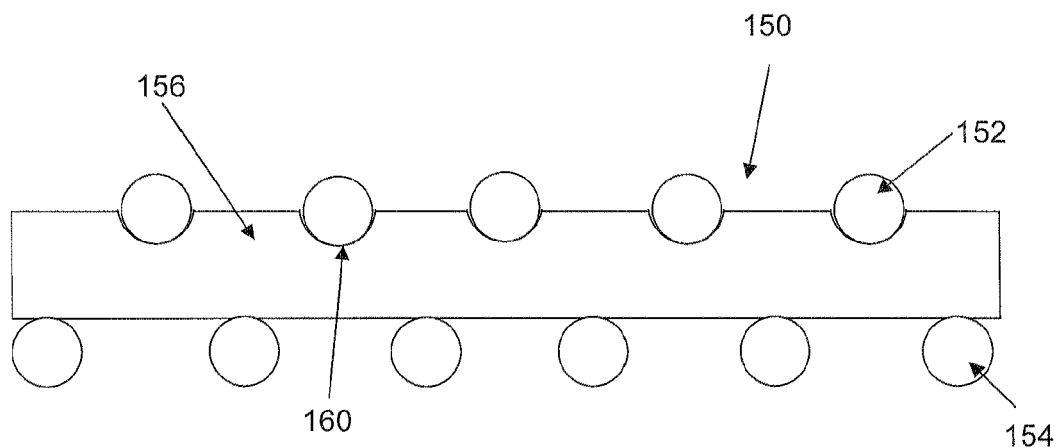
FIGS. 6(a)-6(c) are cross-sectional views of an industrial fabric, according to one embodiment of the present invention.
Figure 6B:
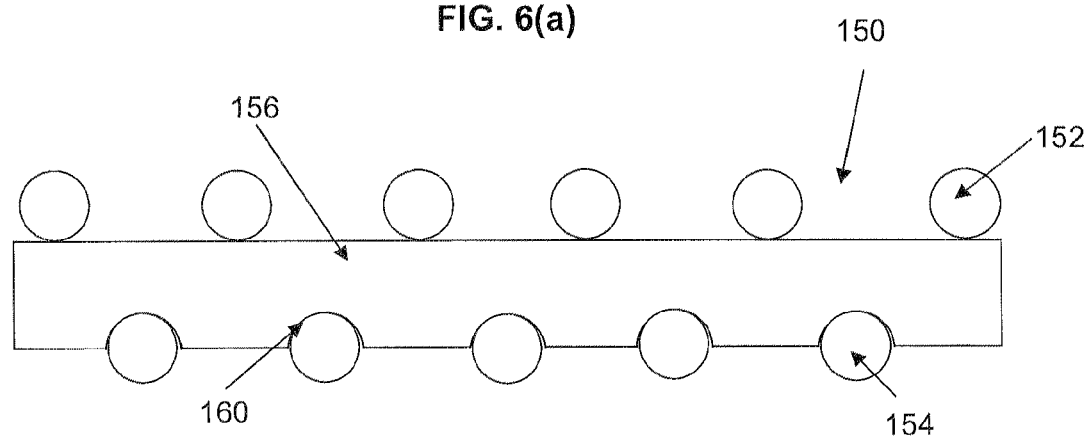
Figure 6C:
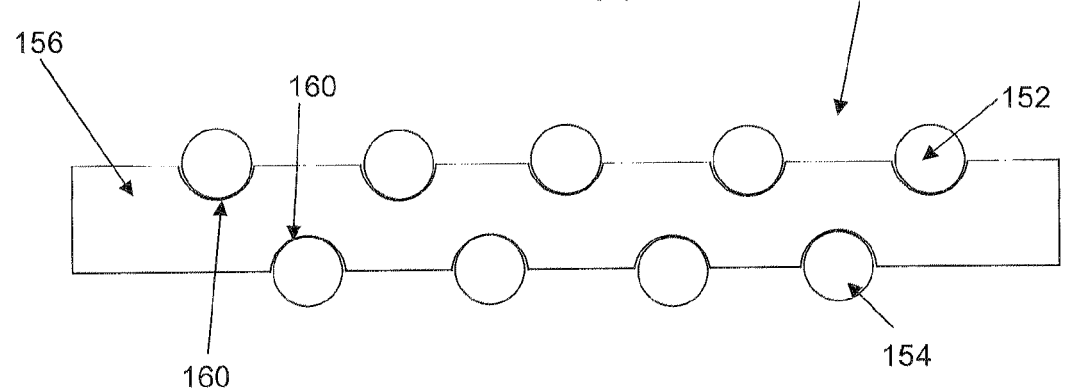

According to one exemplary embodiment, the nonwoven extruded film or sheet, which is elastic, resilient, and compressible in a thickness direction and extensible, bendable, and resilient in its length and transverse directions may have continuous grooves formed on a surface thereof to partially embed the yarns in the grooves, and to ensure uniform spacing of the yarns. This feature allows the use of a thicker film or sheet layer without increasing the thickness of the overall structure. For example, the nonwoven extruded film or sheet 156 may have grooves 160 formed on its top surface as shown in FIG. 6(a), where MD or CD yarns 152 are partially embedded into grooves 160 and can be uniformly spaced. Alternatively, the nonwoven extruded film or sheet 156 may have grooves 160 formed on its bottom surface as shown in FIG. 6(b) where MD or CD yarns 154 on the bottom side are partially embedded into grooves 160 and can be uniformly spaced. As a further alternative, the nonwoven extruded film or sheet 156 may have grooves 160 formed on both its surfaces as shown in FIG. 6(c), where MD or CD yarns 152, 154 are partially embedded into grooves 160 and can be uniformly spaced on both sides of the film or sheet layer 156. Although grooves may be helpful in ensuring uniform spacing of the yarns, such a feature is not essential for the proper function of the inventive structure. Grooves 160 are depicted as having a 'C' or semi-circular shape only as an example, i.e. grooves 160 can have any cross-sectional shape including, but not limited to, square, rectangular, triangular, elliptical, trapezoidal, hexagonal and other polygonal shapes, suitable to accommodate the yarns embedded therein.

In all of the embodiments described herein, the MD or CD yarns in one layer can be attached to the nonwoven extruded film or sheet in an adjacent layer or to each other at contact points where they contact each other via use of glues, adhesives, or a thermal fusion/welding method as known to those skilled in the art. Alternatively, the MD and/or CD yarns are attached to the nonwoven extruded films or sheets by needling one or more layers of a fibrous batt material through the structure from either or both outside surfaces.

The MD and CD yarns used in the present invention are preferably monofilaments, although other forms such as multifilaments, plied monofilaments or multifilaments, wrapped members comprising different materials, knitted members, twisted members, multicomponent members, and braided members can also be used in the practice of the invention. In structures where monofilaments are used, the monofilaments can have any cross-sectional shape, such as for example, circular, non-circular, square, rectangular, triangular, elliptical, polygonal, trapezoidal or lobate. Similarly, filaments used in twisted, knitted, or braided members can also be non-round in cross-sectional shape. The monofilaments in all of the above structures can have an effective diameter in the range of 0.08-2.0 mm.

Figure 7:
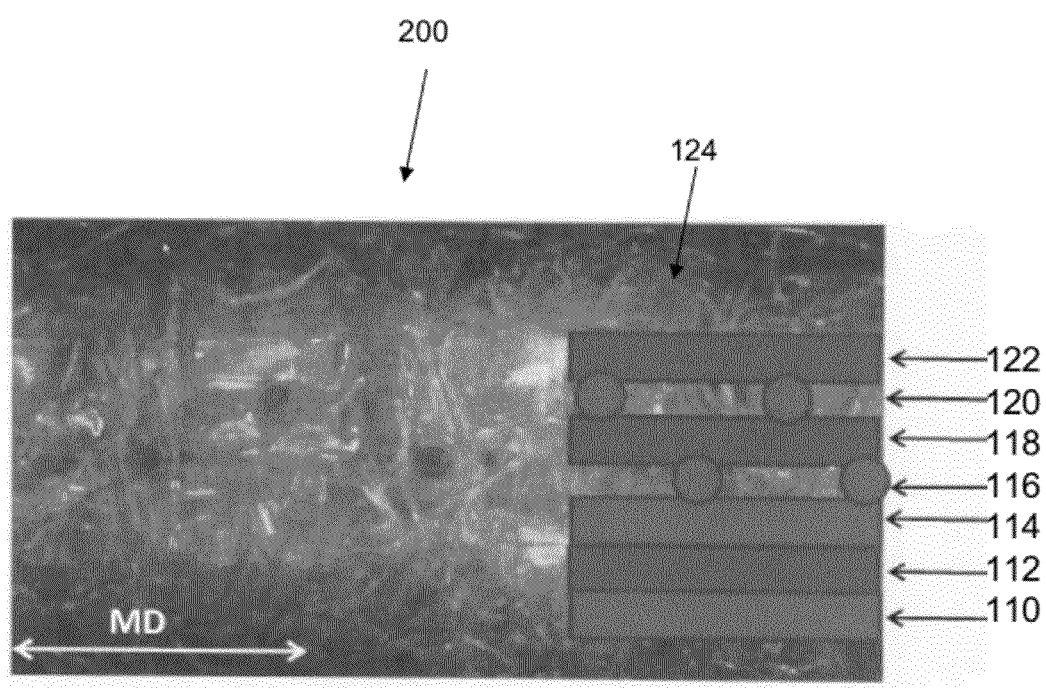
FIG. 7 is a cross-sectional view of an industrial fabric along its MD after needling a batt layer, according to one embodiment of the present invention.
Figure 8:
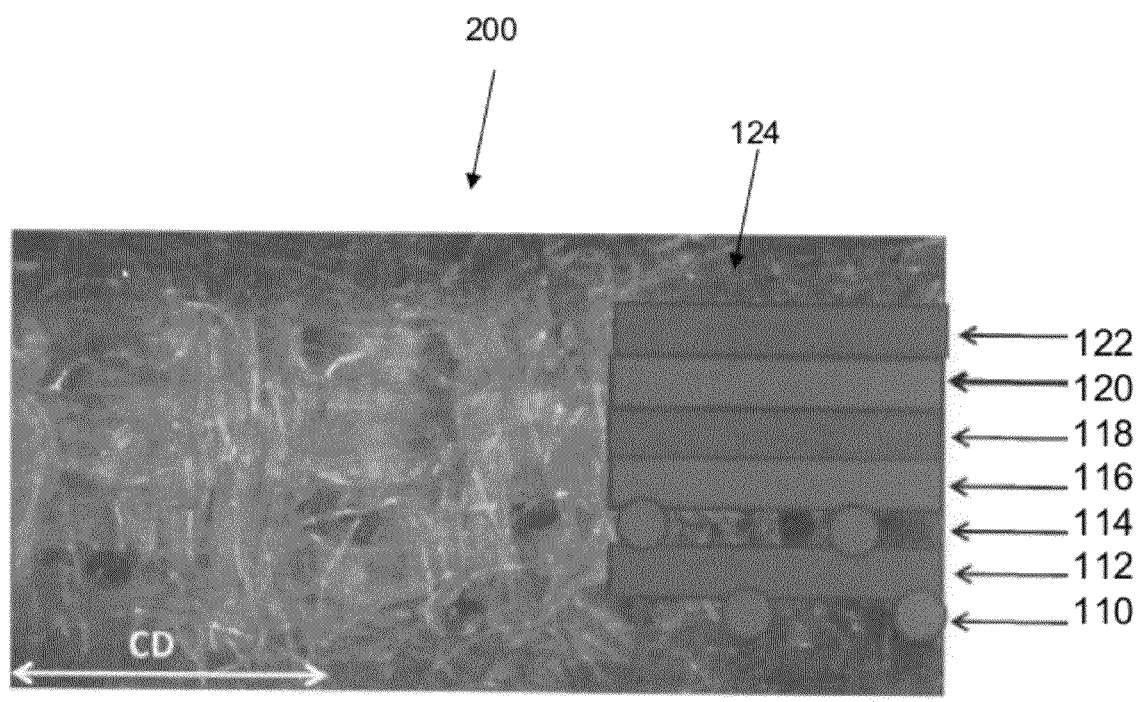
FIG. 8 is a cross-sectional view of an industrial fabric along its CD after needling a batt layer, according to one embodiment of the present invention.

Any of the embodiments and variants discussed above can include one or more layers of a fibrous batt material, which can be needled into the fabric to hold the various layers together. For example, fabric 100 in the above embodiment can be needled using a fibrous batt material 124 to form a consolidated structure 200, such as that shown in FIGS. 7 and 8, for example. FIG. 7 is a cross-sectional view of the fabric along its MD after needling a batt material 124, according to one embodiment of the present invention, and FIG. 8 is a cross-sectional view of the fabric along its CD. The needled batt material 124 may optionally be partially or fully melted for increased bonding between the layers. The fibrous batt material can be composed of any polymer, such as for example, polyester, polyurethane, polypropylene, polyamide, forms thereof and combinations thereof. Additionally, the top and/or bottom surface of the final fabric can be coated with a polymeric resin, which may partially or fully impregnate the fabric.

According to another embodiment of the invention, all the structures described above as having at least one MD load bearing yarn layer can be employed to produce spiral wound strips of material as taught in U.S. Pat. No. 5,360,656, the entire content of which is incorporated herein by reference. Alternatively, structures described herein can be used to produce papermaker's fabric as described in U.S. Pat. No. 6,723,208, the entire content of which is incorporated herein by reference.

All the structures above can be made endless in the machine direction. They can also have a seam to allow on-machine seaming capability. One method to make such a seam in "crossless" structures is taught in U.S. Pat. No. 4,979,543, the entire content of which is incorporated herein by reference.

Also the degree of compression/resiliency is controlled by the elasticity or compressibility of the required nonwoven extruded film or sheet, number of layers of the elastic film or sheet, and of course the totality of the structure itself. The placement of the nonwoven extruded film or sheet must be such that the nonwoven extruded film or sheet compresses upon a normal load being applied to the base fabric, and the base fabric 'springs back' upon removal of that load. The inventive structure can also be part of a laminate with other yarn arrays or base fabrics attached thereto.

Moreover, in the case of a dryer or TAD fabric, the multi-layer embodiments discussed above, may be particularly advantageous in that as the fabric structure passes around a roll, for example a dryer can, the yarns in the dryer fabric will at least partially nest improving contact area of the paper sheet to the dryer can surface and therefore improve heat transfer. This would be caused by a temporary increase in MD tension as the dryer fabric passes around a roll and not due to any applied load normal to the fabric. In such applications, however, a high temperature elastic material may be used to produce the nonwoven extruded film or sheet, such as for example a high temperature elastic polyester.

Figure 9:
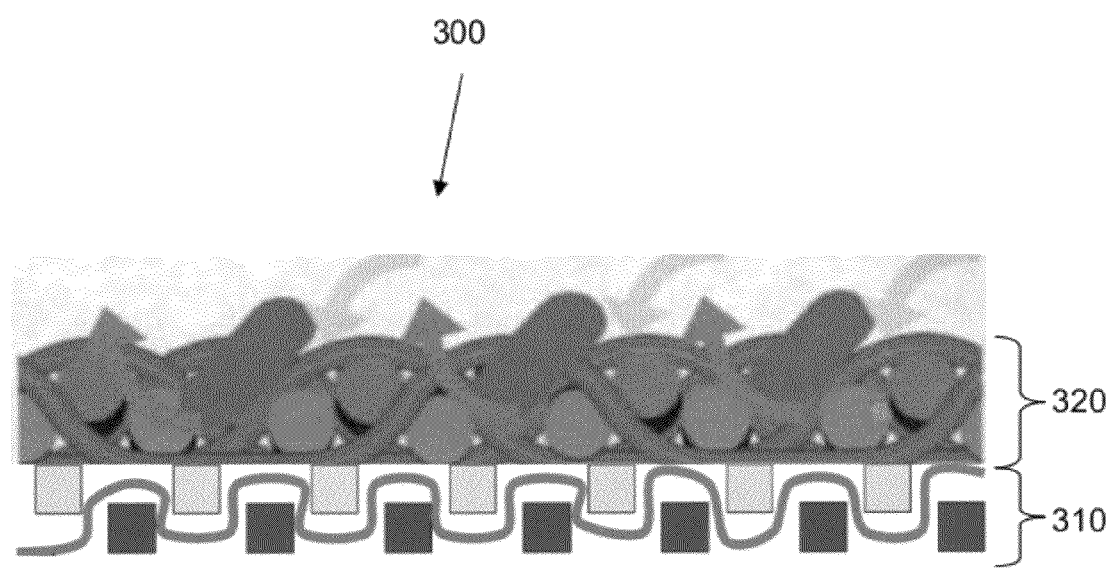
FIG. 9 is a cross-sectional view of an industrial fabric, according to one embodiment of the present invention.

The invention, according to another embodiment, is a support layer 310 of a dryer fabric 300, where the inventive fabric forms the sheet side component of the dryer fabric 300, as shown in FIG. 9, for example. In this fabric 300, the "angled" or backside 320 is the non-sheet contact side of the fabric. This side "chops up" laminar flow and induces "flow" in the dryer pocket, and reduces axial (to the side) or CD direction air flow, and helps mass transfer. In such an arrangement, the support fabric 310 compresses on the dryer can, increasing sheet contact area with the can and therefore improves heat transfer. Therefore, the embodiment forms an improved dryer fabric with an engineered sheet side 310 for heat transfer promotion and optimization, and engineered backside 320 for mass transfer promotion and optimization.

Modifications to the present invention would be obvious to those of ordinary skill in the art in view of this disclosure, but would not bring the invention so modified beyond the scope of the appended claims.

The invention claimed is:

1. A compressible resilient industrial fabric comprising:
   one or more layers of a nonwoven extruded film or sheet, wherein the nonwoven extruded film or sheet is elastic, resilient, and compressible in a thickness direction, and extensible, bendable and resilient in its length and transverse directions; and
   two or more layers of a plurality of substantially parallel machine direction (MD) yarns, wherein the fabric comprises:
   a first layer of the parallel yarns running in MD;
   a second layer of the elastic nonwoven extruded film or sheet on one side of the first layer;
   a third layer of the parallel yarns on the opposite of the second layer as the first layer and running in the same direction as those of the first layer, and
   wherein the parallel yarns of the third layer are aligned such that they nest between the spaces created between the parallel yarns of the first layer.

2. The fabric as claimed in claim 1, wherein the number of yarns in the third layer is less than the number of yarns in the first layer or vice versa.

3. The fabric as claimed in claim 1, further comprising:
   a fourth layer of the elastic nonwoven extruded film or sheet on the opposite of the third layer as the second layer; and
   a fifth layer of parallel yarns in the same direction as the first layer, wherein the yarns of the fifth layer are aligned in the same vertical plane in a through thickness direction as that of the first layer.

4. The fabric as claimed in claim 1, wherein the elastic nonwoven extruded film or sheet comprises a polymeric material.

5. The fabric as claimed in claim 4, wherein the polymeric material is selected from the group consisting of: a polyurethane, a rubber, silicone, Lycra®, Estane®, and a high temperature polyester.

6. The fabric as claimed in claim 1, wherein the elastic nonwoven extruded film or sheet is perforated with a plurality of through holes.

7. The fabric as claimed in claim 6, wherein the through holes have a shape selected from the group consisting of circular, non-circular, square, rectangular, triangular, elliptical, trapezoidal, polygonal, and lobate.

8. The fabric as claimed in claim 1, wherein the fabric is a paper machine clothing;
   a forming fabric;
   a press fabric;
   a dryer fabric;
   a through air dryer fabric;
   a shoe press belt base;
   a calendar belt base;
   an engineered fabric base;
   a transfer belt base;
   a belt used in the production of nonwovens by processes such as airlaid, melt blowing, spunbonding, and hydroentangling; or
   an industrial process belt such as a textile finishing belt or tanning belt.

9. The fabric as claimed in claim 1, wherein the fabric is a laminate base for a dryer fabric, whereby the dryer fabric further includes;
   a backside or a non-sheet contact side of the fabric, the backside including angled components.

10. The fabric as claimed in claim 1, wherein the fabric is an endless or an on-machine seamable fabric.

11. The fabric as claimed in claim 1, wherein strips of the fabric are spiral wound to form a desired width and desired length of the final base structure.

12. The fabric as claimed in claim 1, further comprising: one or more layers of a fibrous batt material.

13. The fabric as claimed in claim 12, wherein the fibrous batt material is needled into the fabric.

14. The fabric as claimed in claim 12, wherein the fibrous batt material is applied on a top and/or bottom surface of the fabric, and needled therethrough.

15. The fabric as claimed in claim 1, wherein a top and/or bottom surface of the fabric is coated with a polymeric resin.

16. The fabric as claimed in claim 15, wherein the polymeric resin at least partially impregnates the fabric.

17. The fabric as claimed in claim 1, wherein the nonwoven extruded layer has continuous grooves formed on one or both its surfaces.

18. The fabric as claimed in claim 17, wherein the grooves have a cross-sectional shape selected from the group consisting of semi-circle, square, rectangular, triangular, elliptical, trapezoidal, hexagonal and other polygonal shapes.

19. A compressible resilient industrial fabric comprising:
one or more layers of a nonwoven extruded film or sheet, wherein the nonwoven extruded film or sheet is elastic, resilient, and compressible in a thickness direction, and extensible, bendable and resilient in its length and transverse directions;
two or more layer of a plurality of substantially parallel machine direction (MD) yarns; and
one or more layers of a plurality of substantially parallel cross-machine direction (CD) yarns attached on top of or under the one of the two or more layers or parallel machine direction (MD) yarns;
wherein the parallel yarns of at least two of the two or more layers of parallel machine direction (MD) yarns are aligned such that one layer of parallel machine direction (MD) yarns nests between the spaces created between the parallel yarns of the other of the two or more layers.

20. The fabric as claimed in claim 19, wherein the MD and CD yarns are selected from the group consisting of monofilaments, multifilaments, plied monofilaments or muitifilaments, wrapped members comprising different materials, knitted members, twisted members, multicomponent members, and braided members.

21. The fabric as claimed in claim 19, wherein the MD and CD yarns have a cross-section selected from the group consisting of: circular, non-circular, square, rectangular, triangular, elliptical, polygonal, trapezoidal and lobate.

22. The fabric as claimed in claim 19, wherein the MD yarns and CD yarns have a yarn diameter in the range of 0.08-2.0 mm.

23. The fabric as claimed in claim 19, wherein the one or more layers of MD and/or CD yarns are thermally welded or glued to the one or more layers of nonwoven extruded film or sheet.

24. The fabric as claimed in claim 19, wherein the one or more layers of MD and/or CD yarns are attached to the one or more layers of elastic nonwoven extruded film or sheet by needling one or more layers of a fibrous batt material.

25. A compressible resilient industrial fabric comprising:
(a) a first layer of a plurality of substantially parallel machine direction (MD) yarns, (b) a second layer of an elastic nonwoven extruded film or sheet, wherein the elastic nonwoven extruded film or sheet is elastic, resilient, and compressible in a thickness direction, and extensible, bendable, and resilient in its length and transverse directions, (c) a third layer of a plurality of substantially parallel machine direction (MD) yarns, (d) a fourth layer of a plurality of substantially parallel cross-machine direction (CD) yarns, (e) a fifth layer of the elastic nonwoven extruded film or sheet, (f) a sixth layer of a plurality of substantially parallel cross-machine direction (CD) yarns, and (g) a seventh layer of the elastic nonwoven extruded film or sheet,
wherein the parallel yarns of at least two of the layers of parallel machine direction (MD) yarns are aligned such that one of the layers of parallel machine direction (MD) yarns nests between the spaces created between the parallel yarns of the other layer of parallel machine direction (MD) yarns.

26. The fabric as claimed in claim 25, wherein the first layer is on a machine side of the fabric, and the seventh layer is on a sheet side of the fabric.

27. The fabric as claimed in claim 25, wherein the fabric is a press fabric, and the press fabric increases a press nip width by up to 5 mm when compared to a press nip width created by a conventional press fabric of the same initial thickness under the same normal load.

28. The fabric as claimed in claim 25, wherein the layers of the fabric are needled together using one or more layers of a fibrous batt material.

29. The fabric as claimed in claim 25, wherein the layers of the fabric are attached together by needling therethrough one or more layers of a fibrous batt material, and at least partially melting the batt material.

30. The fabric as claimed in claim 25, wherein a top and/or bottom surface of the fabric is coated with a polymeric resin material.

31. The fabric as claimed in claim 25, wherein the nonwoven extruded layer has continuous grooves formed on one or both its surfaces.

32. The fabric as claimed in claim 31, wherein the grooves have a cross-sectional shape selected from the group consisting of semi-circle, square, rectangular, triangular, elliptical, trapezoidal, hexagonal and other polygonal shapes.

33. A method of forming a compressible resilient industrial fabric, the method comprising the steps of;
providing one or more layers of an elastic nonwoven extruded film or sheet, wherein the nonwoven extruded film or sheet is elastic, resilient, and compressible in a thickness direction, and extensible, bendable, and resilient in its length and transverse directions; and
attaching one or more layers of a plurality of substantially parallel machine direction (MD) yarns to a top and/or bottom surface of the nonwoven extruded film or sheet, wherein the method comprises;
providing a first layer of the parallel yarns running in MD;
attaching a second layer of the elastic nonwoven extruded film or sheet on one side of the first layer; and
attaching a third layer of the parallel yarns on the opposite of the second layer as the first layer and running the same direction as those of the first layer,
wherein the parallel yarns of the third layer are aligned such that they nest between the spaces created between the parallel yarns of the first layer.

34. The method as claimed in claim 33, wherein the number of yarns in the third layer is less than the number of yarns in the first layer or vice versa.

35. The method as claimed in claim 33, further comprising the steps of:
applying a fourth layer of the elastic nonwoven extruded film or sheet on the opposite of the third layer as the second layer; and attaching a fifth layer of parallel yarns in the same direction as the first layer, wherein the yarns of the fifth layer are aligned in the same vertical plane in a through thickness direction as that of the first layer.

36. The method as claimed in claim 33, wherein the elastic nonwoven extruded film or sheet comprises a polymeric material.

37. The method as claimed in claim 36, wherein the polymeric material is selected from the group consisting of a polyurethane, a rubber, silicone, Lycra®, Estane®, and a high temperature polyester.

38. The method as claimed in claim 33, wherein the elastic nonwoven extruded film or sheet is perforated with a plurality of through holes.

39. The method as claimed in claim 38, wherein the through holes have a shape selected from the group consisting of circular, non-circular, square, rectangular, triangular, elliptical, trapezoidal, polygonal, and lobate.

40. The method as claimed in claim 33, wherein the fabric is a
   paper machine clothing;
   a forming fabric;
   a press fabric;
   a dryer fabric;
   a through air dryer fabric;
   a shoe press belt base;
   a calendar belt base;
   an engineered fabric base;
   a transfer belt base;
   a belt used in the production of nonwovens by processes such as airlaid, melt blowing, spunbonding, and hydroentangling; or
   an industrial process belt such as a textile finishing belt or tanning belt.

41. The method as claimed in claim 33, wherein the fabric is a laminate base for a dryer fabric, whereby a backside or a non-sheet contact side of the fabric is provided with angled components.

42. The method as claimed in claim 33, wherein the fabric is an endless or an on-machine seamable fabric.

43. The method as claimed in claim 33, further comprising the step of:
   spiral winding a strip of the fabric to form a final base structure of the desired width and length.

44. The method as claimed in claim 33, further comprising the step of:
   applying one or more layers of a fibrous batt material to a top and/or bottom surface of the fabric.

45. The method as claimed in claim 44, further comprising the step of:
   needling therethrough the fibrous batt material into the fabric.

46. The method as claimed in claim 45, further comprising the step of:
   coating a top and/or bottom surface of the fabric with a polymeric resin.

47. The method as claimed in claim 46, wherein the polymeric resin at least partially impregnates the fabric.

48. The method as claimed in claim 33, wherein the nonwoven extruded layer has continuous grooves formed on one or both its surfaces.

49. The method as claimed in claim 48, wherein the grooves have a cross-sectional shape selected from the group consisting of semi-circle, square, rectangular, triangular, elliptical, trapezoidal, hexagonal and other polygonal shapes.

50. A method of forming a compressible resilient industrial fabric, the method comprising the steps of:
   providing one or more layers of an elastic nonwoven extruded film or sheet, wherein the nonwoven extruded film or sheet is elastic, resilient, and compressible in a thickness direction, and extensible, bendable, and resilient in its length and transverse directions;
   attaching two or more layers of a plurality of substantially parallel machine direction (MD) yarns to a top and/or bottom surface of the nonwoven extruded film or sheet; and
   attaching one or more layers of a plurality of substantially parallel cross-machine direction (CD) yarns on top of or under the one or more layers of parallel machine direction (MD) yarns,
   wherein the parallel yarns of at least two of the two or more layers of parallel machine direction (MD) yarns are aligned such that one layer of parallel machine direction (MD) yarns nests between the spaces created between the parallel yarns of the other of the two or more layers.

51. The method as claimed in claim 50, wherein the MD and CD yarns are selected from the group consisting of monofilaments, multifilaments, plied monofilaments or multifilaments, wrapped members comprising different materials, knitted members, twisted members, multicomponent members, and braided members.

52. The method as claimed in claim 50, wherein the MD and CD yarns have a cross-section selected from the group consisting of circular, non-circular, square, rectangular, triangular, elliptical, polygonal, trapezoidal and lobate.

53. The method as claimed in claim 50, wherein the MD yarns and CD yarns have a yarn diameter in the range of 0.08-2.0 mm.

54. The method as claimed in claim 50, further comprising the step of:
   attaching the one or more layers of MD and/or CD yarns to the one or more layers of nonwoven extruded film or sheet by thermal welding or gluing.

55. The method as claimed in claim 50, further comprising the step of:
   attaching the one or more layers of MD and/or CD yarns to the one or more layers of nonwoven extruded film or sheet by needling therethrough one or more layers of a fibrous batt material.

56. A method of forming a compressible resilient industrial fabric, the method comprising the steps of:
   (a) providing a first layer of a plurality of substantially parallel machine direction (MD) yarns, (b) attaching a second layer of an elastic nonwoven extruded film or sheet on top of the first layer, wherein the nonwoven extruded film or sheet is elastic, resilient, and compressible in a thickness direction, and extensible, bendable, and resilient in its length and transverse directions, (c) attaching a third layer of a plurality of substantially parallel machine direction (MD) yarns on top of the second layer, (d) applying a fourth layer of a plurality of substantially parallel cross-machine direction (CD) yarns on top of the third layer, (e) applying a fifth layer of the elastic nonwoven extruded film or sheet on top of the fourth layer, (f) applying a sixth layer of a plurality of substantially parallel cross-machine direction (CD) yarns on top of the fifth, and (g) applying a seventh layer of the elastic nonwoven extruded film or sheet on top of the sixth layer,
   wherein the parallel yarns of at least two of the layers of parallel machine direction (MD) yarns are aligned such that one of the layers of parallel machine direction (MD)

yarns nests between the spaces created between the parallel yarns of the other layer of parallel machine direction (MD) yarns.

57. The method as claimed in claim 56, wherein the first layer is on a machine side of the fabric, and the seventh layer is on a sheet side of the fabric.

58. The method as claimed in claim 56, wherein the fabric is a press fabric, and the press fabric increases a press nip width by up to 5 mm when compared to a press nip width created by a conventional press fabric of the same initial thickness under the same normal load.

59. The method as claimed in claim 56, further comprising the step of:
- attaching the layers of the fabric together by needling therethrough one or more layers of a fibrous batt material.

60. The method as claimed in claim 56, further comprising the step of:
- attaching the layers of the fabric by applying one or more layers of a fibrous batt material, and at least partially melting the batt material.

61. The method as claimed in claim 56, further comprising the step of:
- coating a top and/or bottom surface of the fabric with a polymeric resin material.

62. The method as claimed in claim 56, wherein the nonwoven extruded layer has continuous grooves formed on one or both its surfaces.

63. The method as claimed in claim 62, wherein the grooves have a cross-sectional shape selected from the group consisting of semi-circle, square, rectangular, triangular, elliptical, trapezoidal, hexagonal and other polygonal shapes.

* * * * *